United States Patent
Luscher et al.

(10) Patent No.: US 10,254,384 B2
(45) Date of Patent: Apr. 9, 2019

(54) ELECTRONIC DEVICE MOVEMENT DETECTION

(71) Applicant: GreatCall, Inc., San Diego, CA (US)

(72) Inventors: Matthew Luscher, San Diego, CA (US); Joel Stair, San Diego, CA (US); Jasen Cotton, San Diego, CA (US); Gavin Sermona, San Diego, CA (US); Luis Sanchez, San Diego, CA (US); John Arrizza, Oceanside, CA (US)

(73) Assignee: GreatCall, Inc., San Diego, CA (US)

( * ) Notice: Subject to any disclaimer, the term of this patent is extended or adjusted under 35 U.S.C. 154(b) by 0 days.

(21) Appl. No.: 15/702,588

(22) Filed: Sep. 12, 2017

(65) Prior Publication Data

US 2019/0079162 A1 Mar. 14, 2019

(51) Int. Cl.
*H04M 11/04* (2006.01)
*G01S 5/22* (2006.01)

(52) U.S. Cl.
CPC .............. *G01S 5/22* (2013.01); *H04M 11/04* (2013.01); *H04M 2242/04* (2013.01); *H04M 2242/30* (2013.01)

(58) Field of Classification Search
None
See application file for complete search history.

(56) References Cited

U.S. PATENT DOCUMENTS

| 8,258,942 B1* | 9/2012 | Lanzone | G08B 21/0283 340/3.1 |
|---|---|---|---|
| 2008/0304361 A1* | 12/2008 | Peng | G01S 15/74 367/127 |
| 2014/0045556 A1* | 2/2014 | Subramanian | H04W 52/0251 455/574 |
| 2014/0228059 A1* | 8/2014 | Jalali | H04W 4/043 455/456.6 |
| 2015/0087332 A1* | 3/2015 | Pijl | G01S 19/34 455/456.1 |
| 2016/0178748 A1* | 6/2016 | Shin | G01S 15/42 367/99 |

\* cited by examiner

*Primary Examiner* — Maria El-Zoobi
(74) *Attorney, Agent, or Firm* — Kilpatrick Townsend & Stockton LLP

(57) ABSTRACT

A method of operating a communications device to maintain a position fix of the communications device includes obtaining a position fix using a position determination capability of the device, such as a global positioning system capability. The method further includes emitting a first acoustic signal, and recording a baseline acoustic signature in response to the emission of the first acoustic signal. The method further includes emitting an additional acoustic signal and recording an additional acoustic signature resulting from the emission of the additional acoustic signal, comparing the baseline acoustic signature with the additional acoustic signature, and estimating, based at least in part on the comparison of the baseline and additional acoustic signatures, whether the communications device has moved between the recordings of the baseline and additional acoustic signatures.

29 Claims, 8 Drawing Sheets

ELECTRONIC DEVICE MOVEMENT DETECTION

BACKGROUND OF THE INVENTION

Various devices and systems have been developed for providing remote assistance to individuals. Such systems are sometimes called mobile personal emergency response systems (MPERS). Typically, a client of such a service enrolls in the service and provides emergency contact information to the provider of the service. The client carries a mobile device such as a specially-programmed cellular phone or another kind of device for contacting the service provider. When the client needs assistance, he or she uses the device to contact the service provider, who can answer questions, provide assistance such as navigational assistance, or summon help for the client if needed. For example, the service provider may contact one of the client's emergency contacts, or may summon official emergency response personnel.

As part of the service, the device may periodically determine its location. The location can be reported to the service provider, for example immediately upon the client calling the service provider. The service provider may use this location information to assist the client, for example to provide navigation assistance, or to direct additional help to the client. In some cases, the device may report its location periodically to the service provider.

Some devices may determine their location using a global positioning system (GPS) receiver. However, a GPS receiver requires a relatively large amount of power, and repeated GPS position fixes may deplete the battery of a portable device more quickly than desired.

There is a need for more energy efficient methods of estimating client location and movement.

BRIEF SUMMARY OF THE INVENTION

According to one aspect, a method of operating a communications device to maintain a position fix of the communications device includes obtaining a position fix using a position determination capability of the device. The method further includes emitting a first acoustic signal, and recording a baseline acoustic signature in response to the emission of the first acoustic signal. The method further includes emitting an additional acoustic signal and recording an additional acoustic signature resulting from the emission of the additional acoustic signal, comparing the baseline acoustic signature with the additional acoustic signature, and estimating, based at least in part on the comparison of the baseline and additional acoustic signatures, whether the communications device has moved between the recordings of the baseline and additional acoustic signatures. In some embodiments, the final emitting, comparing, and estimating steps are performed repeatedly. In some embodiments, the final emitting, comparing, and estimating steps are performed repeatedly at intervals. In some embodiments, the method further comprises determining, based at least in part on the comparison of the baseline and additional acoustic signatures, whether to obtain a new position fix using the position determination capability of the device. In some embodiments, a new position fix is obtained using the position determination capability of the device when the baseline and additional acoustic signatures differ by more than a predetermined threshold amount. In some embodiments, determination of whether to obtain a new position fix using the position determination capability of the device is based in part on a movement history of the communications device. In some embodiments, the determination of whether to obtain a new position fix using the position determination capability of the device is based in part on the most recent position fix obtained by the communications device. In some embodiments, the method further comprises obtaining a new position fix using the position determination capability of the device when a predetermined period of time has elapsed since the last position fix was obtained using the position determination capability of the device. In some embodiments, the method further comprises adjusting the period of time between the obtaining of position fixes using the position determination capability of the device. In some embodiments, the method further comprises adjusting the period of time between the obtaining of position fixes using the position determination capability of the device based at least in part on a battery charge level of the communications device. In some embodiments, the method further comprises adjusting the period of time between the obtaining of position fixes using the position determination capability of the device based at least in part on a time of day. In some embodiments, the method further comprises, whenever a position fix is obtained using the position determination capability of the device, replacing the baseline acoustic signature. In some embodiments, replacing the baseline acoustic signature comprises replacing the baseline acoustic signature with the most recently obtained acoustic signature. In some embodiments, replacing the baseline acoustic signature comprises emitting a new acoustic signal; recording a new acoustic signature in response to the emission of the new acoustic signal; and replacing the baseline acoustic signature with the new acoustic signature. In some embodiments, the method further comprises adjusting the period of time between the obtaining of acoustic signatures. In some embodiments, the method further comprises estimating whether the communications device is indoors or outdoors. In some embodiments, emitting an acoustic signal comprises emitting an ultrasound signal. In some embodiments, emitting an ultrasound signal comprises emitting a series of ultrasound pulses. In some embodiments, comparing the baseline and additional acoustic signatures comprises performing a cross correlation calculation on numerical representations of the baseline and additional acoustic signatures. In some embodiments, the method further comprises receiving, from a user of the device, an instruction to call a particular telephone number; placing a telephone call to the particular telephone number; recognizing that the call is connected to a recipient at the telephone number; and upon recognizing that the call is connected, transmitting an indication of the most recent position fix to the call recipient. In some embodiments, the first emitted acoustic signal and the additional emitted acoustic signal are the same. In some embodiments, obtaining a position fix using a position determination capability of the device comprises obtaining a position fix using a global positioning system receiver.

According to another aspect, a communications device comprises a wide area communications transceiver, a position determination capability, an acoustic transmitter, an acoustic receiver, a processor, and memory. The memory holds data and instructions. The instructions, when executed by the processor, cause the communications device to: obtain a first position fix using the position determination capability; emit a first acoustic signal from the acoustic transmitter; record a baseline acoustic signature from an output of the acoustic receiver in response to the emission of the first acoustic signal; emit an additional acoustic signal and record an additional acoustic signature resulting from the emission of the additional acoustic signal; compare the baseline acoustic signature with the additional acoustic signature; and estimate, based on the comparison of the baseline and additional acoustic signatures, whether the communications device has moved between the recordings of the baseline and additional acoustic signatures. In some embodiments, the final emit, compare, and estimate functions are performed repeatedly. In some embodiments, the final emit, compare, and estimate functions are performed repeatedly at intervals. In some embodiments, the instructions further cause the device to, when the estimate indicates that the communications device has moved between the recordings of the baseline and additional acoustic signatures: obtain a new position fix using the position determination capability; and replace the baseline acoustic signature. In some embodiments, the instructions further cause the device to replace the baseline acoustic signature with the most recently obtained acoustic signature. In some embodiments, the instructions further cause the device to: emit a new acoustic signal; and record a replacement baseline acoustic signature resulting from the emission of the new acoustic signal. In some embodiments, the acoustic transmitter is omnidirectional. In some embodiments, the acoustic transmitter is unidirectional. In some embodiments, the acoustic transmitter is positioned to preferentially direct acoustic signals upward.

DETAILED DESCRIPTION OF THE INVENTION

The ensuing description provides preferred example embodiment(s) only, and is not intended to limit the scope, applicability or configuration of the disclosure. Rather, the ensuing description of the preferred example embodiment(s) will provide those skilled in the art with an enabling description for implementing a preferred example embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments. Furthermore, embodiments may be implemented by manual techniques, automatic techniques, or any combination thereof.

Figure 1:
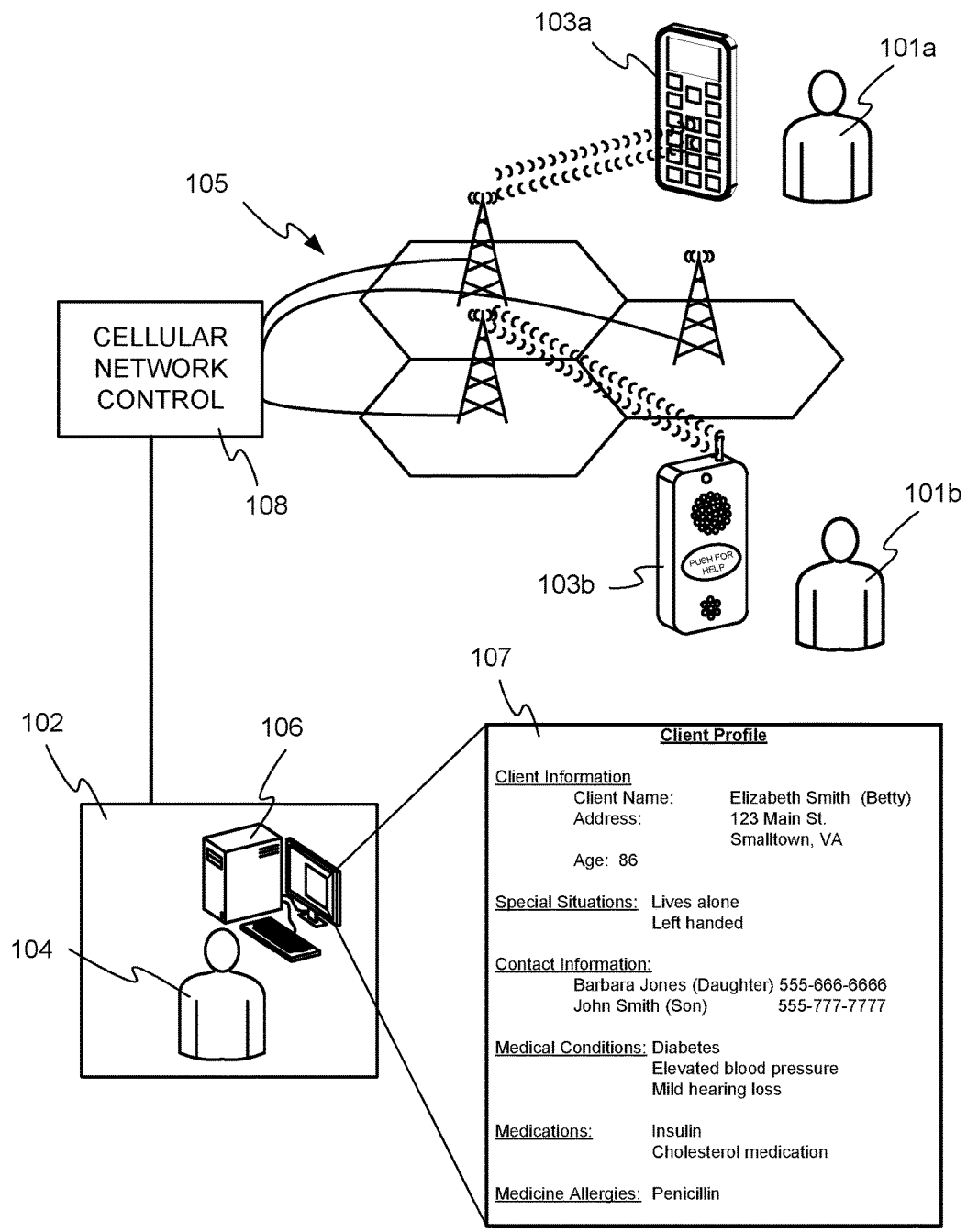
FIG. 1 illustrates the operation of a telephone-based assistance service with which embodiments of the invention may find utility.

Embodiments of the invention may find particular utility in conjunction with an assistance service, as depicted in FIG. 1. In the example arrangement of FIG. 1, clients 101a and 101b of a private response center (PRC) 102 use their portable electronic devices 103a and 103b to reach PRC 102. PRC 102 may be operated, for example, by a response service provider who offers personalized assistance to clients who subscribe to the service. In some embodiments, the response service provider may offer personal health management advice, concierge services, navigational assistance, technical support for telephones used in conjunction with the service, or other kinds of personalized services deliverable by telephone. PRC 102 may be staffed by customer service representatives 104 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. Although PRC 102 is shown as a staffed service, in other embodiments PRC 102 may also be a fully automated system, self-service website, mobile application, or similar.

In one example scenario, the service provider that operates PRC 102 may also be a cellular telephone service provider, and may offer a private assistance service as an adjunct to cellular telephone service. PRC 102 can be contacted through a phone number, speed dial or other shortcut, for example by activating a 5 and * key combination on a telephone, by activating an application on a smart phone, or by other methods. FIG. 1 illustrates contacting PRC 102 using cellular devices through cellular network 105, controlled by a cellular network controller 108, but clients of PRC 102 may reach PRC 102 by other means as well, for example via conventional wire line telephone, using a voice-over-Internet-protocol (VOIP), or any other suitable connection method that enables a user to reach PRC 102. PRC 102 may be reachable via multiple methods.

While embodiments of the invention are described primarily in the context of a private response center, the invention is not so limited and may be embodied with a public facility as well.

PRC 102 includes a computer system 106 that may be used for various functions. For example, information about calls from clients may be displayed to customer service representative 104. Computer system 106 may store personal information gathered from clients that may be helpful in rendering assistance to the clients. Computer system 106 may assist customer service representative 104 in the performance of his or her job, for example automating telephone dialing and the like. While computer system 106 is illustrated as a single computer, it will be recognized that the term "computer system" encompasses many different kinds of installations, including systems of multiple computers linked together. The multiple computers may be co-located or widely dispersed. In other embodiments, computer system 106 may be implemented using a mobile device, service, or application, or other Internet service.

Computer system 106 may also store a personal profile of each client. For example, upon enrollment in the service provided by PRC 102, a client may provide information about his or her medical conditions, medications, and other information that may assist PRC 102 in assisting the client. The client may also provide contact information for family members or other entities that can be contacted in the event of an emergency, or who are to be informed about the health and well-being of the client. An abbreviated example personal profile 107 is shown in FIG. 1. Upon receiving a call from a client of PRC 102, computer system 106 may display the client's personal profile to the customer service representative handling the call, so that the customer service representative can better assist the client, and can immediately identify contacts who may need to be notified of the call or included in a response to the call.

Figure 2A:
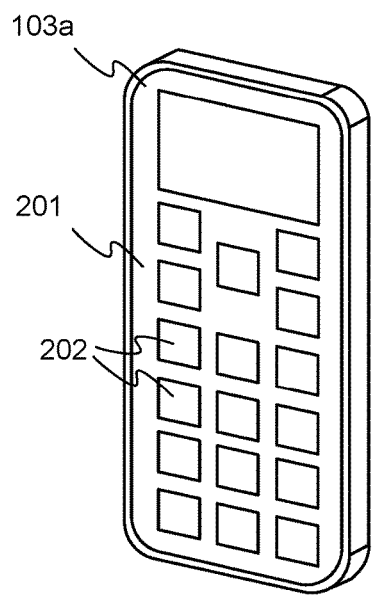
FIGS. 2A-2C illustrate communication devices usable in embodiments of the invention.

FIG. 2A illustrates example cellular telephone 103*a* in more detail. Cellular telephone 103*a* may be a so-called "smart phone" or other similar device such as a tablet computer. Smart phone 103*a* includes complete cellular telephone capability, but may perform many other functions as well, for example running application programs that provide a host of capabilities. A touchscreen 201 or other kind of display may be provided, on which a keypad 202 may be emulated. Cellular telephone 103*a* also includes a microphone and speaker (not shown) for use as a telephone. In some embodiments, a call to response center 102 may be initiated by activating a software application on telephone 103*a*, for example by actuating a control in the user interface shown on touchscreen 201.

Figure 2B:
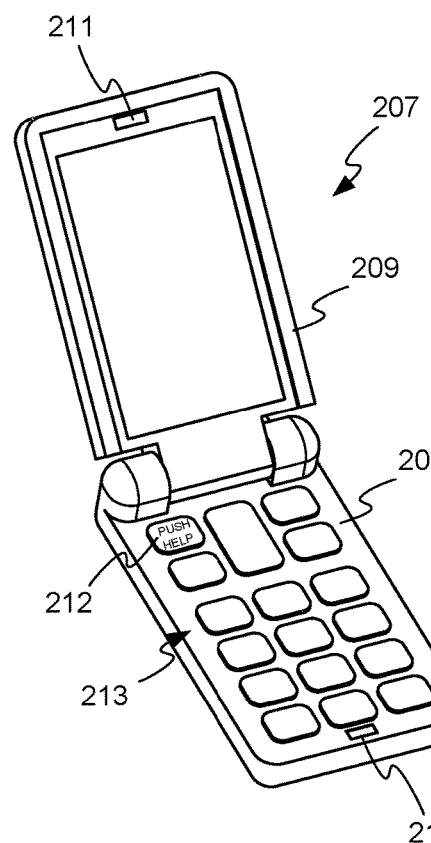

FIG. 2B illustrates another kind of mobile device 207 usable in embodiments of the invention. Device 207 is in the form of a "flip" phone, having a keypad portion 208 and a display portion 209 that swivel with respect to each other, so that the phone folds for storage and carrying, but unfolds for use. A microphone 210 and speaker 211 are conveniently positioned for telephone communication. A designated shortcut key 212 may be used to contact response center 102 directly, while keypad 213 enables calling other telephone numbers.

Figure 2C:
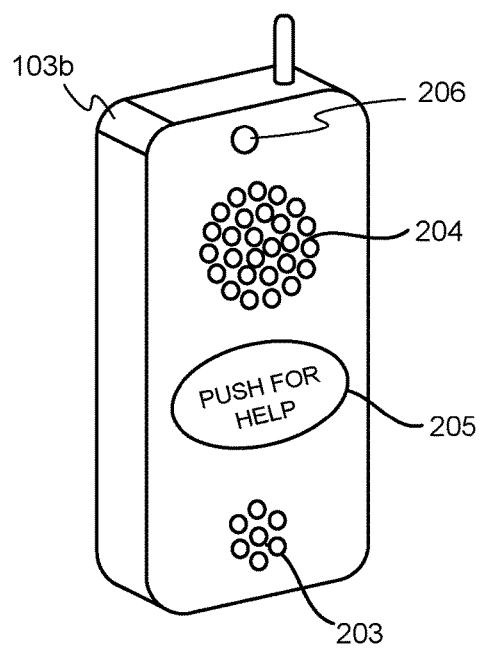

FIG. 2C illustrates simplified mobile communicator 103*b* in more detail. Simplified communicator 103*b* may be especially useful for some clients of response center 102. Example mobile communicator 103*b* may internally be a fully-featured cellular telephone, but has a simplified input interface comprising one button 205 for initiating a call directly to response center 102. Simplified communicator 103*b* may also be referred to as a "fob" or an "emergency communicator." For the purposes of this disclosure, the term "telephone" is intended to encompass mobile communicator 103*b*. A client of private response center 102 may wear simplified communicator 103*b* on his or her person, and can use it to contact private response center 102 whenever assistance is needed. For example, simplified communicator 103*b* may be configured to dial private response center 102 when button 205 is pressed. This greatly simplified input interface may be especially helpful to clients with impairments such as poor vision or coordination that make it difficult to operate a conventional cellular telephone that has many small keys. The single-button input interface assures that private response center 102 will be called without the client having to press a sequence of keys. In an event where help is needed, the client may be distraught or disoriented, and the simplified input interface increases the chance of the client reaching private response center 102. For the purpose of this disclosure, a user interface is "simplified" if it does not provide for the dialing of arbitrary telephone numbers.

Simplified communicator 103*b* further includes a microphone 203 and a speaker 204, enabling telephone or telephone-like communication. In some embodiments, simplified communicator 103*b* does not include a display, although one may be included on which messages can be shown to the user. In some embodiments, simplified communicator 103*b* may include an indicator light 206 or other visual indicator. Indicator light 206 may be used, for example, to indicate that the device is active, connected on a call, or the like.

Other embodiments of the invention may use other kinds of devices. For example, embodiments of the invention may use dedicated-purpose wireless devices as is described in more detail below. In any event, a device used by clients of PRC 102 may be specially programmed to interact with computer system 106, to facilitate the service provided by PRC 102. For example, a device such as device 103*a* or 103*b* may periodically ascertain its geographic location, and may report its location immediately upon being connected with PRC 102. The reporting may be by any suitable means, such as a text message to PRC 102, a data call to PRC 102, tones transmitted over the voice connection using dual tone multiple frequency (DTMF) tones, or the like. The client's geographic location may then be provided to customer service representative 104 receiving the call, and this information may assist customer service representative 104 in providing aid to the client. Determining the geographic location of the device is sometimes referred to a geolocation.

Prior devices have used a number of different techniques for geolocation. For example, a device may include a global positioning system (GPS) receiver, and may use signals from the constellation of GPS satellites to determine an accurate absolute position of the device. This process may also be called obtaining a position fix, also called a location fix. For the purposes of this disclosure, a "position fix" or "location fix" is an indication of the absolute geographical location of the device. While a GPS location fix may be very accurate, GPS has many drawbacks. First, GPS reception may not be reliable, so that the availability or accuracy of location fixes obtained by GPS may be compromised, especially when a client device is indoors. Second, the circuitry required for GPS reception uses a significant amount of power, and therefore is a drain on the battery of a portable device. With GPS enabled, the device may require recharging with inconvenient frequency, and there is an increased risk that the device could run out of power completely, making it impossible for the user to reach PRC 102 until the device can be connected to a power source.

Another technique for locating a device is trilateration among cellular telephone towers. The strength of a signal received at a cellular tower from the device is a relative indication of the distance to the tower. The stronger the signal, the closer the tower. By comparing the strengths of signals received at multiple towers whose positions are known, the cellular network provider can estimate the location of the device in question. The device may simply request a position estimate from the network provider, and forward it to PRC 102. However, this kind of position fix is not as accurate as a GPS position fix, and is also subject to signal reception problems, especially in remote or congested areas.

Embodiments of the invention provide a technique for reducing the number of GPS or other kinds of position fixes needed to maintain an accurate geolocation of a device, therefore extending the time the device may operate between chargings, as compared with a device that relies more heavily on GPS to determine its geographic location.

In the discussion below, embodiments will be described in the context of simplified device 103*b*, but it will be recognized that the invention is not so limited, and may be embodied in other kinds of devices.

Figure 3:
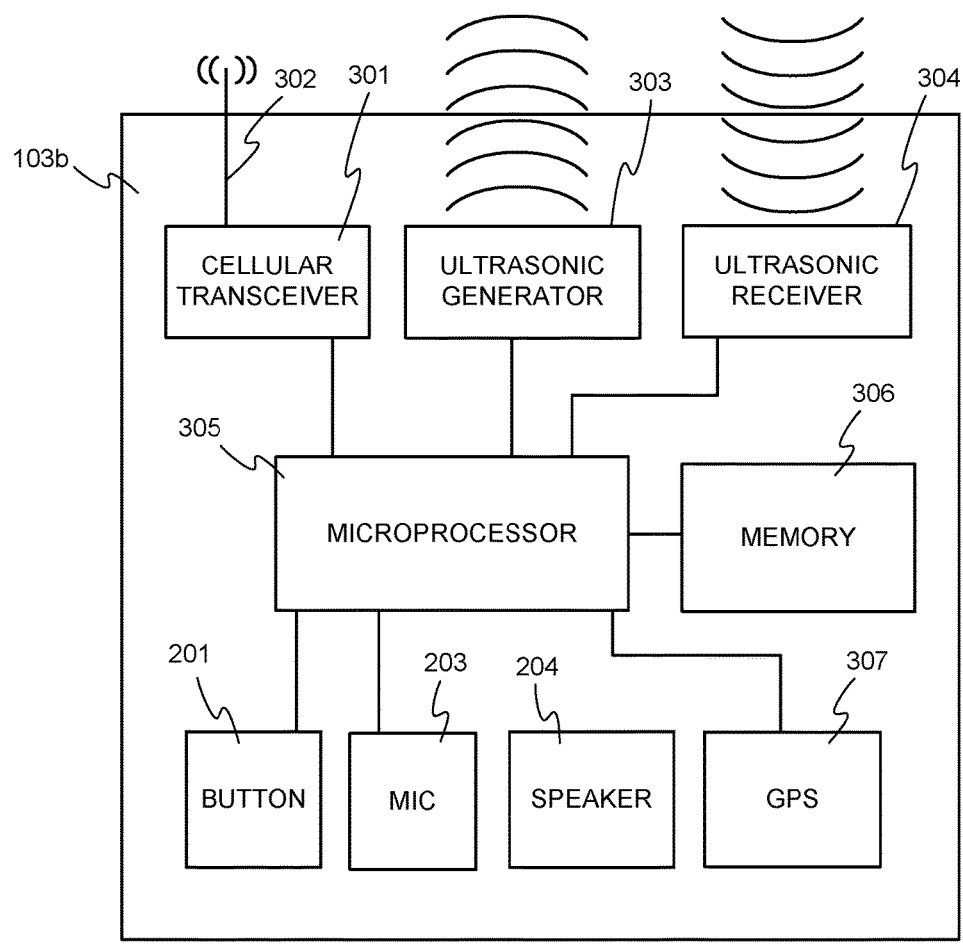
FIG. 3 illustrates a simplified schematic diagram of the communication device of FIG. 2C.

FIG. 3 illustrates a simplified schematic diagram of example electronic architecture of communications device 103b. Device 103b includes a cellular telephone transceiver 301 and antenna 302 for communicating via cellular network 105, for example. Cellular telephone transceiver 301 is an example of a wide area communication capability. Device 103b also includes an ultrasonic generator 303, which is a device capable of generating acoustic oscillations in the ultrasonic range. Device 103b further includes an ultrasonic receiver, which can sense oscillations in the ultrasonic range.

Example device 103b includes a microprocessor 305 that controls the operation of device 103b, under control of instructions stored in a memory 306. Memory 306 may include volatile memory, nonvolatile memory, or a combination of these, and may store user data, application programs, temporary variables, and a variety of other kinds of information.

As is described above, example device 103b includes button 205, speaker 204, and microphone 203. Device 103b may also include a global positioning system (GPS) receiver 307, for receiving signals from GPS satellites, enabling communication device 103b to accurately ascertain its geographical location when enough GPS satellites are "visible" to device 103b. Device 103b may use GPS information in a variety of ways, for example to transmit its location periodically or when requested to PRC 102, as part of a client monitoring service offered by the operator of PRC 102. More information about the operation and possible use of GPS information by a communication device can be found in U.S. Pat. No. 8,489,066 issued Jul. 16, 2013 and titled "Systems and Methods for Identifying Caller Locations", the entire disclosure of which is hereby incorporated by reference herein.

Other features may be present in device 103b as well, for example one or more local wireless communication transceivers such as a Bluetooth®, ZigBee®, NFC™, Wi-Fi™, ANT™, or Z-Wave® transceiver, or another kind of local wireless transceiver.

GPS is one example of a position determination capability, but other position determination capabilities may exist, and their usage also minimized in accordance with embodiments of the invention. For example, device 103b may request a position fix from cellular network controller 108, which may estimate the location of device 103b using signals exchanged between device 103b and various cell towers. In other embodiments, device 103b may sense the presence of nearby wireless networking hotspots, and may forward identifiers of the hotspots to a location service that estimates the location of device 103b by comparing the identifiers with a catalog of known hotspots and their known locations.

Figure 4:
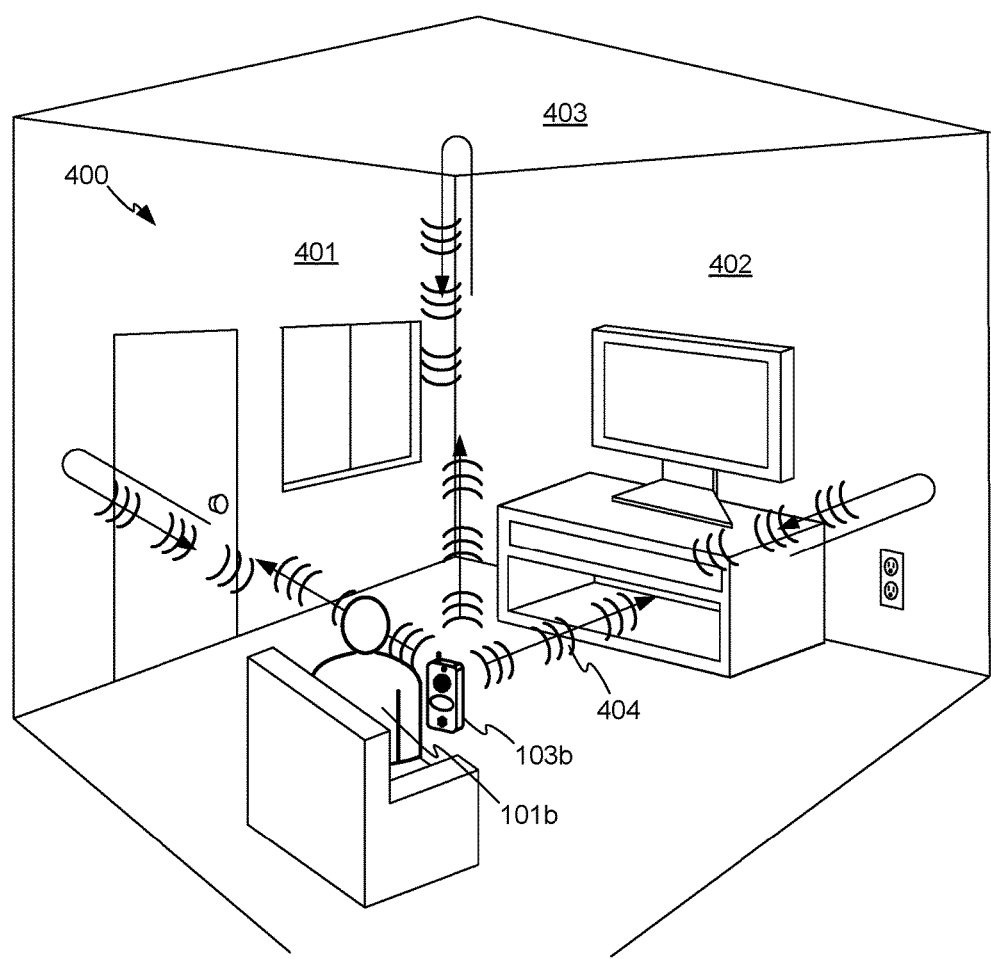
FIG. 4 illustrates an example environment in which embodiments of the invention may find utility.

FIG. 4 illustrates an environment in which embodiments of the invention may be practiced. Client 101b is seated within room 400, and has device 103b on his or her person. Room 400 has walls 401 and 402, and a ceiling 403. Client 101b is positioned in a particular location with respect to the walls and ceiling.

Device 103b periodically emits an acoustic signal. For example, the acoustic signal may be an ultrasound signal transmitted using ultrasonic generator 303. In other embodiments, the acoustic signal may be generated using speaker 204. When speaker 204 is used, the frequency of the acoustic signal may be selected to be difficult for user 101b to hear. For example, a high frequency may be used, but below the ultrasonic range. In any event, device 103b may filter the input received from microphone 203 or ultrasonic receiver 304 when recording an acoustic signature, so that sounds or ultrasonic oscillations at the frequency of the original emitted signal are preferentially used for analysis, and other sounds are screened out. In FIG. 4, the acoustic signal is depicted as a series of pulses 404, but other kinds of signals may be used, for example an oscillation of varying frequency, pulses of varying duration, a continuous signal, a signal with a different or a varying number of pulses as compared with pulses 404, or another kind of signal. In any event, the ultrasound signal propagates through the air in the room. When pulses are used, they are preferably short in duration compared with the time required for sound to traverse a typical room. For example, the pulses may be less than 5 milliseconds in duration, and preferably less than 1 millisecond. In some embodiments, an emitted train of pulses is shorter in duration than the time expected for sound to traverse a typical room.

The acoustic signal may be emitted unidirectionally, omnidirectionally, in orthogonal directions, or in another pattern.

The acoustic signal reflects from surfaces within room 400, for example walls 401 and 402 and ceiling 403, and echoes of the signal return to device 103b. Device 103b receives the reflected signals using ultrasonic receiver 304, microphone 203, or another kind of receiver, and records the resulting acoustic signature. Device 103b then periodically repeats the process to gather a new acoustic signature and compares the new signature with the original signature.

If the acoustic signatures differ more than a threshold amount, it may be presumed that client 101b has moved since the last acoustic signature was obtained, and that another position fix is needed. In that case, device 103b may energize GPS receiver 307 and obtain a GPS position fix, and record the position.

However, if the two acoustic signatures are similar, it may be assumed that client 101b has not moved, and that no update is required to his or her geographic location. In that case, the GPS receiver is not energized, and the expenditure of energy required for a GPS position fix is avoided. Because gathering an acoustic signature requires less energy than taking a GPS fix, energy is saved overall, and the time that device 103b can operate without recharging is extended.

Because acoustic measurement inherently includes some uncertainty, it may be preferable to take GPS position fixes periodically, even if the acoustic signature does not indicate any movement. For example, a device may attempt to determine its location every 20 minutes. After a GPS fix, the device may perform an acoustic signature check every 20 minutes, updating the GPS fix only when an acoustic signature indicates that the client may have moved. However, if a predetermined amount of time has passed since the last GPS fix, then a new GPS fix may be obtained even if the acoustic signature analysis does not indicate movement. For example, GPS fixes may be taken every 100 minutes. Even so, a device that combines acoustic location with GPS location may need to perform only a small number of GPS fixes as compared with a device that relies exclusively on GPS (20% in this example). Significant battery energy may be saved, and significant operation time between chargings may be added. Other timings and frequencies of acoustic and GPS fixes may be used.

Figure 5:
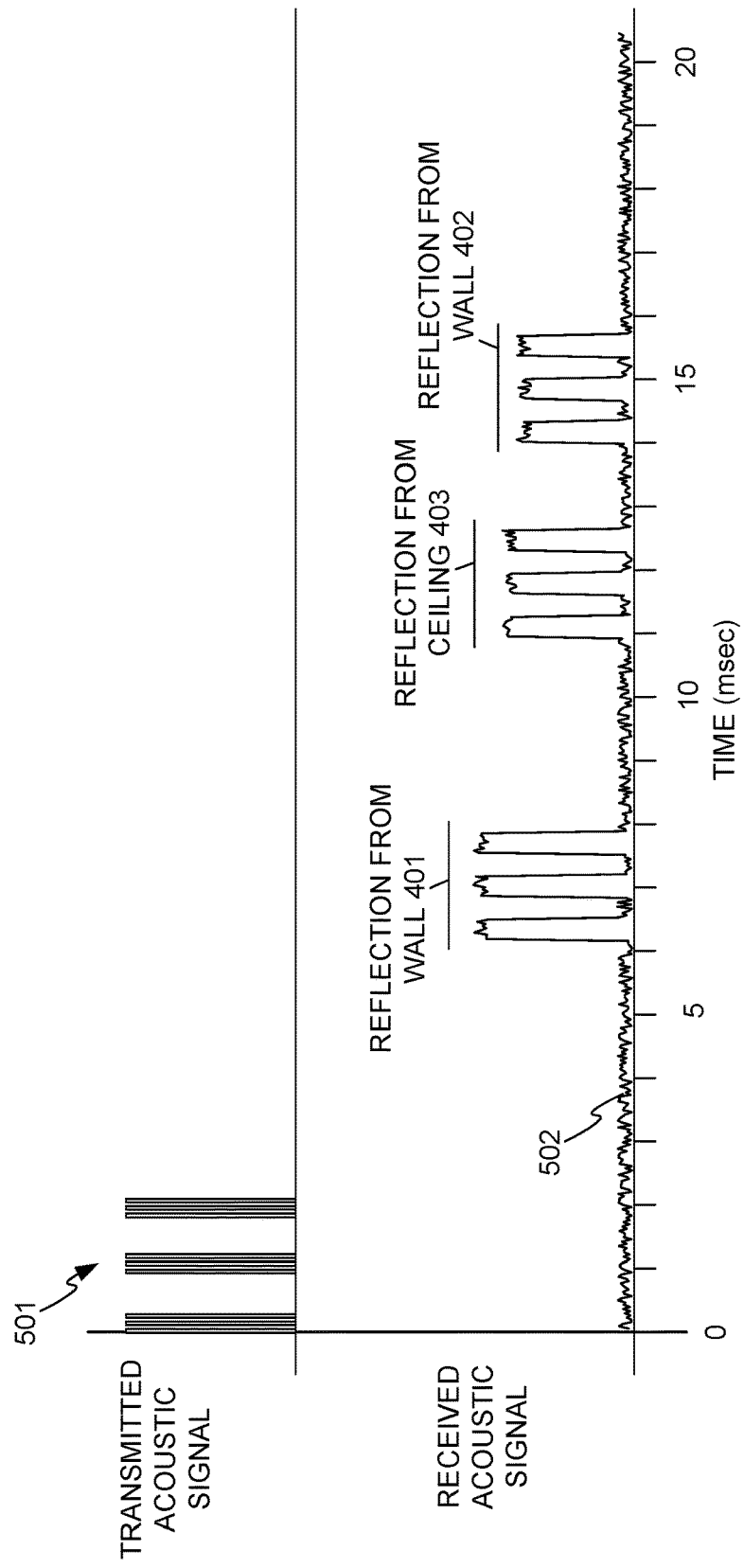
FIG. 5 illustrates an idealized acoustic signature as may be recorded in the environment of FIG. 4.

FIG. 5 illustrates an idealized first acoustic signature as may be recorded in room 400. In this example, three brief acoustic pulses 501 are emitted, and their reflections from the different surfaces in the room arrive back to device 103b at different times. The reflections from the different surfaces may also be of differing amplitudes, depending on the relative distances to the various surfaces and the materials covering the surfaces. The pattern is recorded as a time-varying amplitude of a signal received by ultrasonic receiver 304. The pattern of the received signal is one example of an acoustic signature. The acoustic signature 502 may embed information about the absolute and relative distances to the various surfaces, but it may not be necessary for device 103b to determine the distances. Rather, it may be sufficient to simply evaluate whether the received acoustic signature has changed since the last ultrasound emission.

The example of FIG. 5 is constructed so that the reflections from the various surfaces do not overlap in time. However, this is not a requirement, and acoustic signature may be much more complicated that in this simple example.

Figure 6:
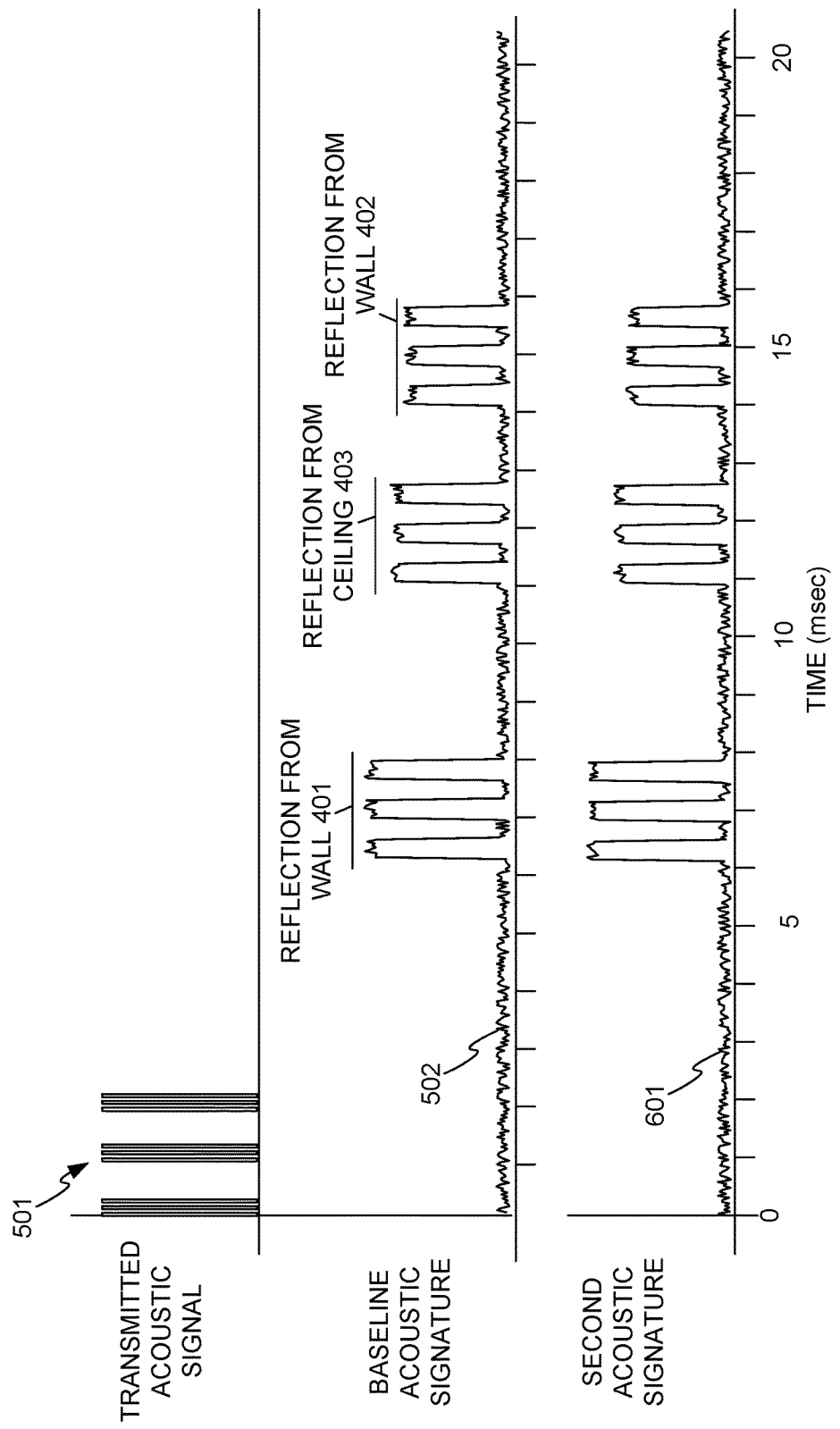
FIG. 6 illustrates another acoustic signature as may be recorded in the environment of FIG. 4

According to embodiments of the invention, device 103b records the acoustic signature 502 as a baseline for comparison. Preferably, a new baseline acoustic signature is collected whenever any GPS fix is obtained, to replace the existing baseline acoustic signature. At a later time, for example after a predetermined interval has passed, device 103b again emits acoustic pulses 501 as a trial, to investigate whether device 103b may have moved since baseline acoustic signature 502 was recorded. In this example, as shown in FIG. 6, a second acoustic signature 601 is received in response to the new transmission of pulses 501. In FIG. 6, baseline acoustic signature 502 and second acoustic signature 601 are shown on aligned sets of axes, for convenient comparison. As can be seen, second acoustic signature 601 is nearly identical to baseline acoustic signature 502, but for differences in random noise. This indicates that device 103b has apparently not moved between the collections of the baseline and second acoustic signatures. Device 103b may determine that the two signatures are very similar, and based on the similarity forego taking of a GPS fix, because a new GPS fix appears to be unnecessary.

Figure 7:
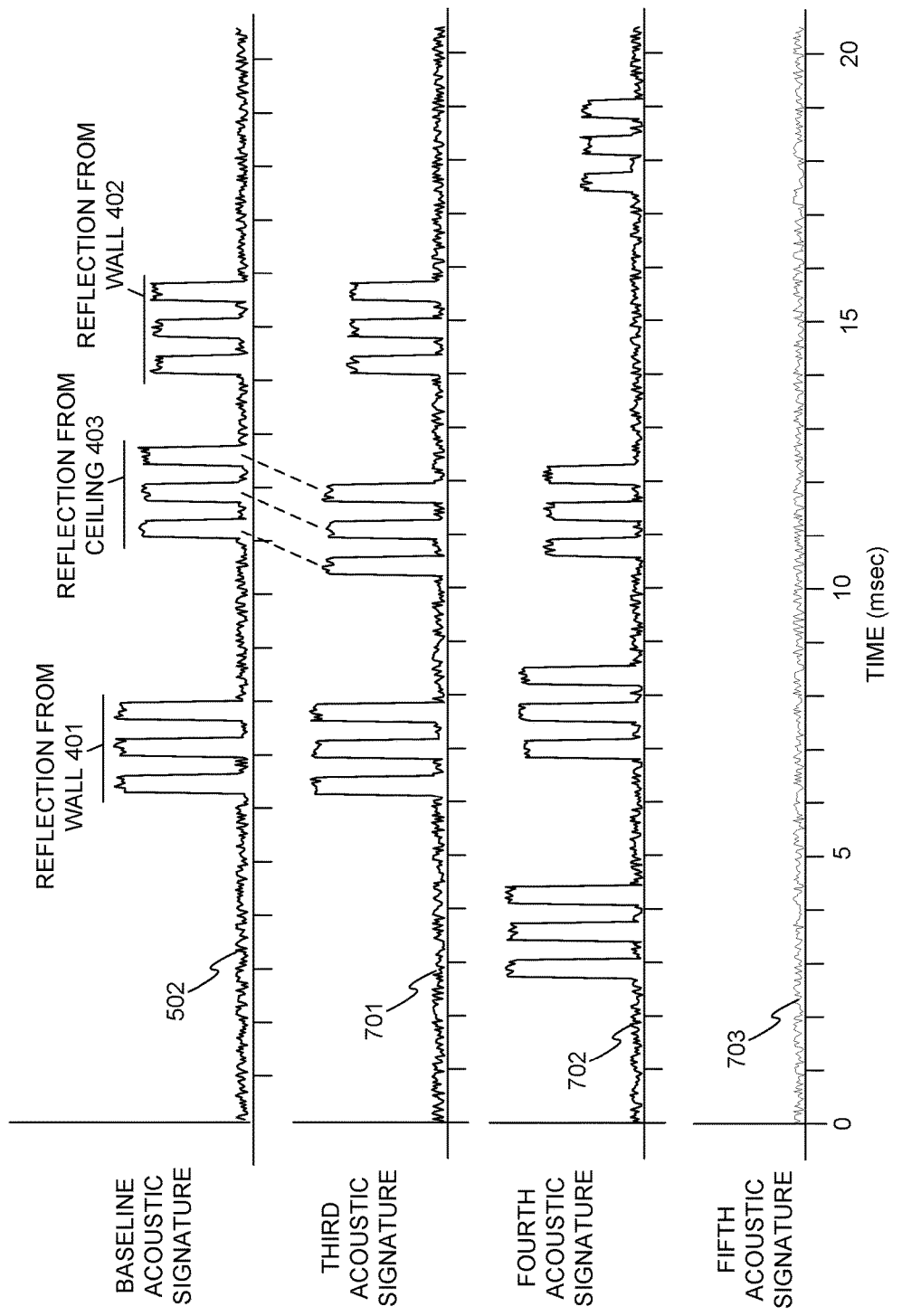
FIG. 7 illustrates a number of other acoustic signatures having varying degrees of similarity to a baseline acoustic signature.

FIG. 7 illustrates a number of other acoustic signatures that are progressively less similar to baseline acoustic signature 502. The additional signatures are presented on axes aligned with baseline signature 502 for convenient comparison.

In third signature 701, the reflections from wall 401 and wall 402 are positioned very similarly to their positions in baseline acoustic signature 502. However, the apparent reflection from ceiling 403 occurs earlier and is slightly higher in amplitude. This may be the result of user 101b standing up, so that he or she is in nearly the same position in room 400 as when baseline acoustic signature 502 was collected, but with device 103b higher in the room. While device 103b likely has no mechanism for measuring elevation, the change in position is reflected in the changed acoustic signature. Device 103b may compare signature 701 with baseline signature 502 and determine that they are similar enough that no new GPS fix is necessary. Or, if device 103b is configured to be very sensitive and to renew its GPS fix when even small changes in position are suspected, device 103b may obtain a new GPS fix based on the comparison of signatures 701 and 502.

By contrast, signature 702 bears little resemblance at all to baseline acoustic signature 502. If acoustic signature 702 is received, device 103b can compare it with baseline signature 502 and determine with high confidence that device 103b (and presumably user 101b) has moved. In that case, device 103b will obtain a new GPS fix.

Finally, signature 703 lacks any echoes of the acoustic pulses. Signature 703 is also much different than baseline signature 502, and will also trigger a new GPS fix. In addition, the complete lack of echoes may indicate that device 103b and user 101b are outdoors.

Any suitable technique can be used for comparing an acoustic signature to the baseline acoustic signature to see if they differ by a threshold amount (indicating that the client has likely moved) or do not significantly differ (indicating that the client likely has not moved). For example, a cross correlation operation may be performed.

One way to perform the cross correlation is to describe the baseline acoustic signature as a first time sequence of received amplitude readings x(0), x(1), x(2), ... x(n−1), and to define the comparison acoustic signature as a second time sequence of received amplitude readings y(0), y(1), y(2), ... y(n−1). The cross correlation value is then given by:

$$C = \frac{\sum_{i=0}^{n-1}(x(i)-\bar{x})*(y(i)-\bar{y})}{\sqrt{\sum_{i=0}^{n-1}(x(i)-\bar{x})^2 * \sum_{i=0}^{n-1}(y(i)-\bar{y})^2}}$$

The cross correlation C gives a numerical estimate of the similarity of the two sequences. Identical sequences X and Y will yield a cross correlation value of C=1.0. The more different the sequences are, typically the lower the cross correlation value. For the sequences described above and shown in FIGS. 6 and 7, the computed cross correlation values are:

| Acoustic Signature | Cross Correlation with Baseline Acoustic Signature 502 | Notes |
|---|---|---|
| 601 (no movement) | 0.993 | Not exactly 1.0 because noise introduced mathematically |
| 701 (user 101b may have stood up) | 0.897 | |
| 702 (user 101b in different environment) | 0.347 | |
| 703 (user 101b possibly outdoors) | 0.425 | |

As is apparent, acoustic signatures that are similar to baseline signature 502 have relatively high cross correlation values, while acoustic signatures that are much different than baseline signature 502 have relatively low cross correlation values. Device 103b may decide whether to obtain a new GPS fix based on the cross correlation value. For example, when the cross correlation value is greater than a predetermined threshold, no GPS fix will be obtained, and when the cross correlation value is below the threshold, a new GPS fix will be obtained. Preferably, a new baseline acoustic signature is obtained with the new GPS fix.

The threshold value may be selected to give the system an appropriate or desired sensitivity to movement. For example, the threshold cross correlation value may be 0.5, 0.6, 0.7, or another value. The higher the value, the more sensitive the system is to movement, and the more often GPS fixes will be obtained. A higher value thus results in more battery energy being used by device 103b, but also reduces the chance that movement of user 101b will be missed.

In some embodiments, the robustness of the comparison between two acoustic signatures may be enhanced by computing the cross correlation for a number of offsets in time between the two signatures, and using the highest cross correlation value.

Because the acoustic analysis is approximate, device 103b preferably obtains a new GPS fix periodically even if the acoustic analysis does not indicate that user 101b has moved. For example, acoustic signatures may be collected and analyzed every 20 minutes, with a new GPS fix (and new baseline acoustic signature) obtained every hour, even if no movement is detected by the acoustic analysis. This technique also helps ensure that movement of user 101b will not be missed. For example, signature 701 is quite similar to baseline signature 502, suggesting that user 101b did not move between the collections of those two signatures. However, it is possible (if unlikely) that during the interval between those two signatures, user 101b traveled to another house and is now seated in a similar position in a similar room. Acoustic analysis alone will not detect this situation, but GPS location will.

Any suitable interval between acoustic analyses and between forced GPS fixes may be used. The intervals may be changed, for example based on the time of day, on the user's historical pattern of movement, on the user's current location, or based on other variables or on a combination of variables. For example, if it is determined that user 101b is in a hospital after midnight, then both acoustic locations and GPS fixes may be delayed, on the assumption that it is unlikely the user will leave the hospital before morning. Many other scenarios may be envisioned.

In other embodiments, the period of time between forced GPS fixes or acoustic analysis may be adjusted. For example, if the charge level of the battery in device 103b becomes low, the device may extend the time between GPS fixes, relying more heavily on acoustic analysis in an effort to extend the time for which the device can continue to function without running out of energy.

In some embodiments, the acoustic analysis capability of device 103b may be simplified, and tailored to collecting specific kinds of information. For example, device 103b may be configured to especially determine if user 101b is indoors or outdoors. Device 103b may send directional acoustic signals only upward, and listen for an echo that is presumed to be from a ceiling in a room. If an echo is received within a time interval of a few milliseconds, it may be presumed that user 101b is indoors. However, if no echo is received, it may be presumed that user 101b is outdoors. This capability may be particularly advantageous in the case of a user who needs careful supervision. Acoustic analyses may be performed every few minutes, and appropriate action taken. For example, device 103b may be configured to automatically contact PRC 102 in the event user 101b is suspected to be outdoors. PRC 102 may then try to contact user 101b by calling device 103b, or may notify a family member, a care facility, or other party for assistance.

Figure 8:
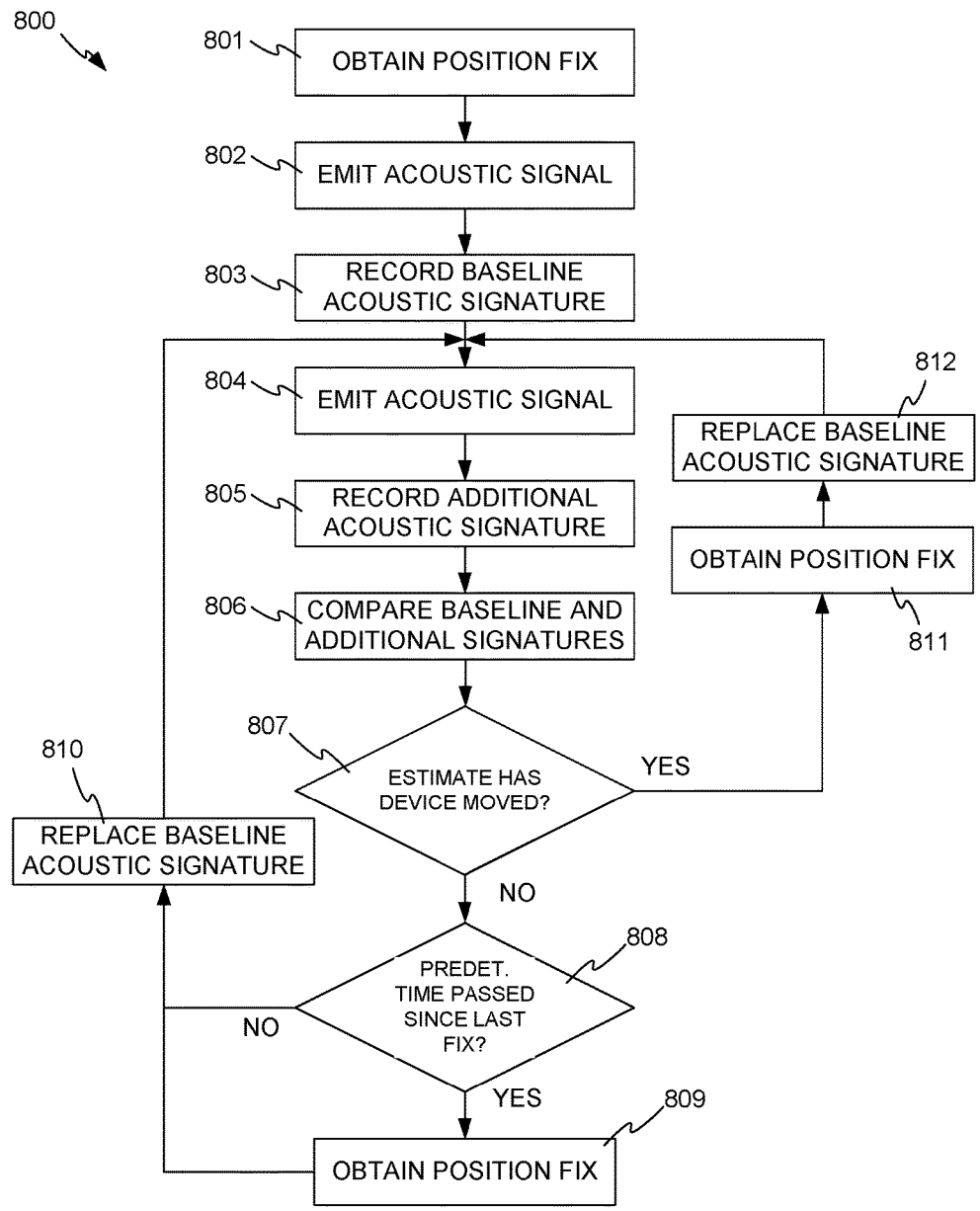
FIG. 8 illustrates a flowchart of a method in accordance with embodiments of the invention.

FIG. 8 illustrates a flowchart of a method 800 in accordance with embodiments of the invention. Method 800 may be performed by a device such as devices 103a, 103b, or 207, or another device usable in embodiments of the invention.

In step 801, a position fix of the device is obtained. For example, the device may obtain an indication of its geographical location via GPS, from the cellular network, from wireless hotspot proximity information, or by another means.

In step 802, the device emits an acoustic signal, for example a series of ultrasonic pulses or another usable signal. In step 803, the device records a baseline acoustic signature. For example, the device may record the output of a microphone or of an ultrasonic receiver for a fixed time period after emitting the acoustic signal.

At step 804, the device emits another acoustic signal, which may be the same as the acoustic signal emitted in step 802. At step 805, the device records an additional acoustic signature in a manner similar to the recording of the baseline acoustic signature.

In step 806, the device compares the baseline and additional acoustic signatures. For example, the device may perform a cross correlation calculation on numerical representations of the baseline and additional acoustic signatures, to obtain an estimate of the similarity of the two acoustic signatures. Other comparison techniques may be used.

In step 807, an estimation is made, based on the comparison of the baseline and additional acoustic signatures, as to whether the device has moved between the recordings of the compared signatures. For example, the result of a cross correlation of the two signatures may be compared with a threshold. If the baseline and additional acoustic signatures do not differ by more than the threshold amount, it may be estimated that the device has not moved, and control passes to step 808. At step 808, it is determined whether a predetermined time period has passed since the most recent position fix. If so, a new position fix is obtained at step 809. If the predetermined time period has not passed, then no new position fix is obtained at this stage. In any event, control passes again to step 804, where, after a time, a new acoustic signal is emitted so that a new additional acoustic signature can be recorded. Optionally, at step 810, the device may replace the baseline acoustic signature with the most recently obtained signature, since the most recent acoustic signature, which may have been obtained only a few seconds earlier. In other embodiments, the baseline acoustic signature may not be replaced, but the existing baseline acoustic signature may be reused. In either event, it may be a much longer time, for example up to 20 minutes or more, before the next acoustic signature is obtained at steps 804 and 805.

Referring again to the decision at step 807, if the baseline and additional acoustic signatures do differ by more than the threshold amount, it may be estimated that the device was moved between the recording of the baseline and additional acoustic signatures. In that case, a new position fix is obtained at step 811.

The device may then replace the baseline acoustic signature with the most recent acoustic signature at step 812, and control may pass again to step 804 where, after a period of time, an additional acoustic signature is obtained and the process repeats.

In other embodiments, when movement is detected, control could pass from decision block 807 to step 801 (omitting steps 811 and 812), so that a new baseline acoustic signature is obtained from scratch, rather than replacing the baseline acoustic signature. Similarly, if no movement is detected and the predetermined time has passed since the most recent position fix, control could pass directly from decision block 808 to step 801 (omitting steps 809 and 810).

While method 800 may be performed entirely by a device such as device 103b, other arrangements are possible. For example, the device may collect the acoustic signatures and forward them to computer system 106 at PRC 102 for processing. Computer system 106 may compare the baseline and additional acoustic signatures and then signal the device to obtain a new position fix if necessary. The communication between the device and PRC 102 may be by any suitable means. For example, the device may forward the acoustic signature data to PRC 102 using a data call, and PRC 102 may communicate instructions to the device via a data call, SMS message, or another technique.

In some embodiments, a device such as device 103b may cooperate with PRC 102 to further the monitoring and care function of PRC 102 using acoustic signature data. For example, device 103b may report some or all of the position fixes and acoustic signatures it obtains to PRC 102, rather than simply reporting its position upon a call to PRC 102. PRC 102 may keep a record of the position fixes and acoustic signatures, and over time may develop a profile of the client's positional behavior. For example, a particular acoustic signature pattern may correlate with the client being in the living room of his or her dwelling, and another acoustic signature pattern may correlate with the client being in a bedroom. Recording the acoustic signature information may enable constructing the behavior pattern of the client with better resolution than simply using GPS or other position fix data, because acoustic signatures may be collected more often.

Once a pattern is established, PRC 102 may look for deviations from the pattern that may raise concerns about the client's well-being. For example, if a "living room" acoustic signature has historically rarely been seen during the nighttime hours for a particular client, but occurs several times during a single week, there may be a concern that the client is not sleeping well, possibly due to stress or illness. PRC 102 may act on this information in an appropriate way. For example, PRC 102 may initiate a check-in call to the client, or PRC 102 may notify one of the client's emergency contacts that a behavioral change has been detected, so that the contact person can make a check-in call or visit. In another example, if a lack of movement is detected over even a relatively short period during hours where movement has historically been common, a check-in call may be made to determine whether the client may have fallen, or may be in some other difficulty.

While the principles of the disclosure have been described above in connection with specific apparatuses and methods, it is to be clearly understood that this description is made only by way of example and not as limitation on the scope of the disclosure. In addition, it is to be understood that all workable combinations of the features and elements disclosed herein are also considered to be disclosed.

What is claimed is:

1. A method of maintaining an indication of the location of a communications device, the method comprising:
   obtaining a position fix of the communications device using a position determination capability of the device;
   emitting a first acoustic signal from the communications device;
   recording a baseline acoustic signature in response to the emission of the first acoustic signal, wherein the baseline acoustic signature results from reflection of the first acoustic signal from the environment of the communications device;
   emitting an additional acoustic signal from the communications device and recording an additional acoustic signature resulting from the emission of the additional acoustic signal, wherein the additional acoustic signature results from reflection of the additional acoustic signal from the environment of the communications device;
   comparing the baseline acoustic signature with the additional acoustic signature;
   estimating, based at least in part on the comparison of the baseline and additional acoustic signatures, whether the communications device has moved between the recordings of the baseline and additional acoustic signatures; and
   determining, based at least in part on the comparison of the baseline and additional acoustic signatures, whether to obtain a new position fix using the position determination capability of the device.

2. The method of claim 1, wherein the second emitting, comparing, and estimating steps are performed repeatedly.

3. The method of claim 2, wherein the final emitting, comparing, and estimating steps are performed repeatedly at intervals.

4. The method of claim 1, wherein a new position fix is obtained using the position determination capability of the device when the baseline and additional acoustic signatures differ by more than a predetermined threshold amount.

5. The method of claim 1, wherein the determination of whether to obtain a new position fix using the position determination capability of the device is based in part on a movement history of the communications device.

6. The method of claim 1, wherein the determination of whether to obtain a new position fix using the position determination capability of the device is based in part on the most recent position fix obtained by the communications device.

7. The method of claim 1, further comprising obtaining a new position fix using the position determination capability of the device when a predetermined maximum period of time has elapsed since the last position fix was obtained using the position determination capability of the device.

8. The method of claim 7, further comprising adjusting the period of time between the obtaining of position fixes using the position determination capability of the device.

9. The method of claim 8, further comprising adjusting the period of time between the obtaining of position fixes using the position determination capability of the device based at least in part on a battery charge level of the communications device.

10. The method of claim 8, further comprising adjusting the period of time between the obtaining of position fixes using the position determination capability of the device based at least in part on a time of day.

11. The method of claim 1, further comprising, whenever a position fix is obtained using the position determination capability of the device, replacing the baseline acoustic signature.

12. The method of claim 11, wherein replacing the baseline acoustic signature comprises replacing the baseline acoustic signature with the most recently obtained acoustic signature.

13. The method of claim 11, wherein replacing the baseline acoustic signature comprises:
    emitting a new acoustic signal;
    recording a new acoustic signature in response to the emission of the new acoustic signal; and
    replacing the baseline acoustic signature with the new acoustic signature.

14. The method of claim 1, further comprising adjusting the period of time between the obtaining of acoustic signatures.

15. The method of claim 1, further comprising estimating whether the communications device is indoors or outdoors.

16. The method of claim 1, wherein emitting an acoustic signal comprises emitting an ultrasound signal.

17. The method of claim 16, wherein emitting an ultrasound signal comprises emitting a series of ultrasound pulses.

18. The method of claim 1, wherein comparing the baseline and additional acoustic signatures comprises performing a cross correlation calculation on numerical representations of the baseline and additional acoustic signatures.

19. The method of claim 1, further comprising:
receiving, from a user of the device, an instruction to call a particular telephone number;
placing a telephone call to the particular telephone number;
recognizing that the call is connected to a recipient at the telephone number; and
upon recognizing that the call is connected, transmitting an indication of the most recent position fix to the call recipient.

20. The method of claim 1, wherein the first emitted acoustic signal and the additional emitted acoustic signal are the same.

21. The method of claim 1, wherein obtaining a position fix using a position determination capability of the device comprises obtaining a position fix using a global positioning system receiver.

22. A communications device, comprising:
a wide area communications transceiver;
a position determination capability;
an acoustic transmitter;
an acoustic receiver;
a processor; and
memory holding data and instructions, wherein the instructions, when executed by the processor, cause the communications device to:
obtain a first position fix using the position determination capability;
emit a first acoustic signal from the acoustic transmitter;
record a baseline acoustic signature from an output of the acoustic receiver in response to the emission of the first acoustic signal, wherein the baseline acoustic signature results from reflection of the first acoustic signal from the environment of the communications device;
emit an additional acoustic signal and record an additional acoustic signature resulting from the emission of the additional acoustic signal, wherein the additional acoustic signature results from reflection of the additional acoustic signal from the environment of the communications device;
compare the baseline acoustic signature with the additional acoustic signature;
estimate, based on the comparison of the baseline and additional acoustic signatures, whether the communications device has moved between the recordings of the baseline and additional acoustic signatures; and
when the estimate indicates that the communications device has moved between the recordings of the baseline and additional acoustic signatures, obtain a new position fix using the position determination capability, and replace the baseline acoustic signature.

23. The device of claim 22, wherein the second emit, compare, and estimate functions are performed repeatedly.

24. The device of claim 22, wherein the second emit, compare, and estimate functions are performed repeatedly at intervals.

25. The device of claim 22, wherein the instructions further cause the device to replace the baseline acoustic signature with the most recently obtained acoustic signature.

26. The device of claim 22, wherein the instructions further cause the device to:
emit a new acoustic signal; and
record a replacement baseline acoustic signature resulting from the emission of the new acoustic signal.

27. The communications device of claim 22, wherein the acoustic transmitter is omnidirectional.

28. The communications device of claim 22, wherein the acoustic transmitter is unidirectional.

29. The communications device of claim 28, wherein the acoustic transmitter is positioned to preferentially direct acoustic signals upward.

* * * * *